United States Patent [19]
Denz et al.

[11] Patent Number: 5,398,661
[45] Date of Patent: Mar. 21, 1995

[54] METHOD AND ARRANGEMENT FOR CHECKING THE OPERABILITY OF A TANK-VENTING SYSTEM

[75] Inventors: Helmut Denz, Stuttgart; Andreas Blumenstock, Ludwigsburg, both of Germany

[73] Assignee: Robert Bosch GmbH, Stuttgart, Germany

[21] Appl. No.: 70,334

[22] PCT Filed: Sep. 1, 1992

[86] PCT No.: PCT/DE92/00725

§ 371 Date: May 26, 1993

§ 102(e) Date: May 26, 1993

[87] PCT Pub. No.: WO93/06357

PCT Pub. Date: Apr. 1, 1993

[30] Foreign Application Priority Data

Sep. 26, 1991 [DE] Germany ............... 41 32 055.7

[51] Int. Cl.⁶ ............................................. F02M 33/02
[52] U.S. Cl. ............................... 123/520; 123/198 D
[58] Field of Search ............... 123/520, 516, 518, 519, 123/521, 198 D

[56] References Cited

U.S. PATENT DOCUMENTS

| | | | |
|---|---|---|---|
| 5,191,870 | 3/1993 | Cook | 123/520 |
| 5,193,512 | 3/1993 | Steinbrenner et al. | |
| 5,220,896 | 6/1992 | Blumenstock | 123/520 |
| 5,295,472 | 3/1994 | Otsuka | 123/198 D |
| 5,297,579 | 3/1994 | Cook | 123/520 |
| 5,299,545 | 4/1994 | Koroda | 123/520 |
| 5,305,724 | 4/1994 | Chikamatsu | 123/520 |
| 5,333,589 | 8/1994 | Otsura | 123/198 D |
| 5,339,788 | 8/1994 | Blumenstock | 123/198 D |
| 5,345,917 | 9/1994 | Maruyama | 123/520 |

FOREIGN PATENT DOCUMENTS

4012111 3/1991 Germany .
62-203039 7/1987 Japan .

*Primary Examiner*—Carl S. Miller
*Attorney, Agent, or Firm*—Walter Ottesen

[57] ABSTRACT

A method for testing for the operability of a tank-venting apparatus on a motor vehicle having an internal combustion engine, the tank-venting apparatus including a tank having a tank pressure sensor, an adsorption filter and a venting line which is closable via a shutoff valve and a tank-venting valve, the adsorption filter being connected to the tank via a tank-supply line and the tank-venting valve being connected to the adsorption filter via a valve line.

11 Claims, 7 Drawing Sheets

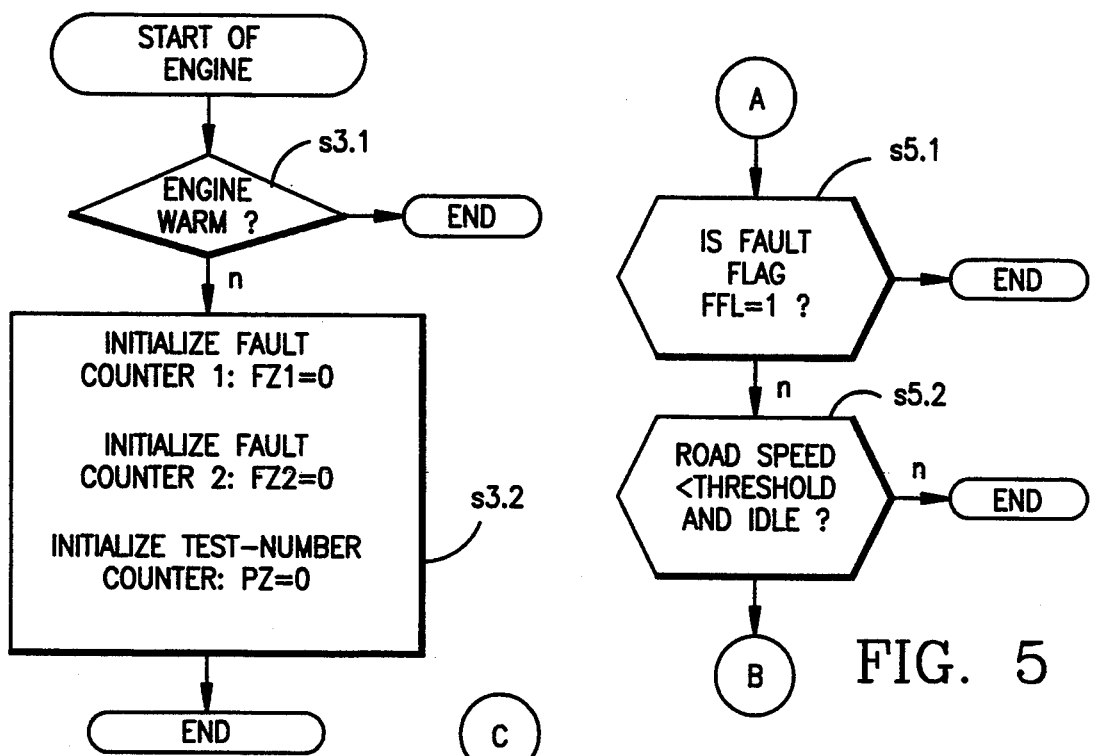
FIG. 3
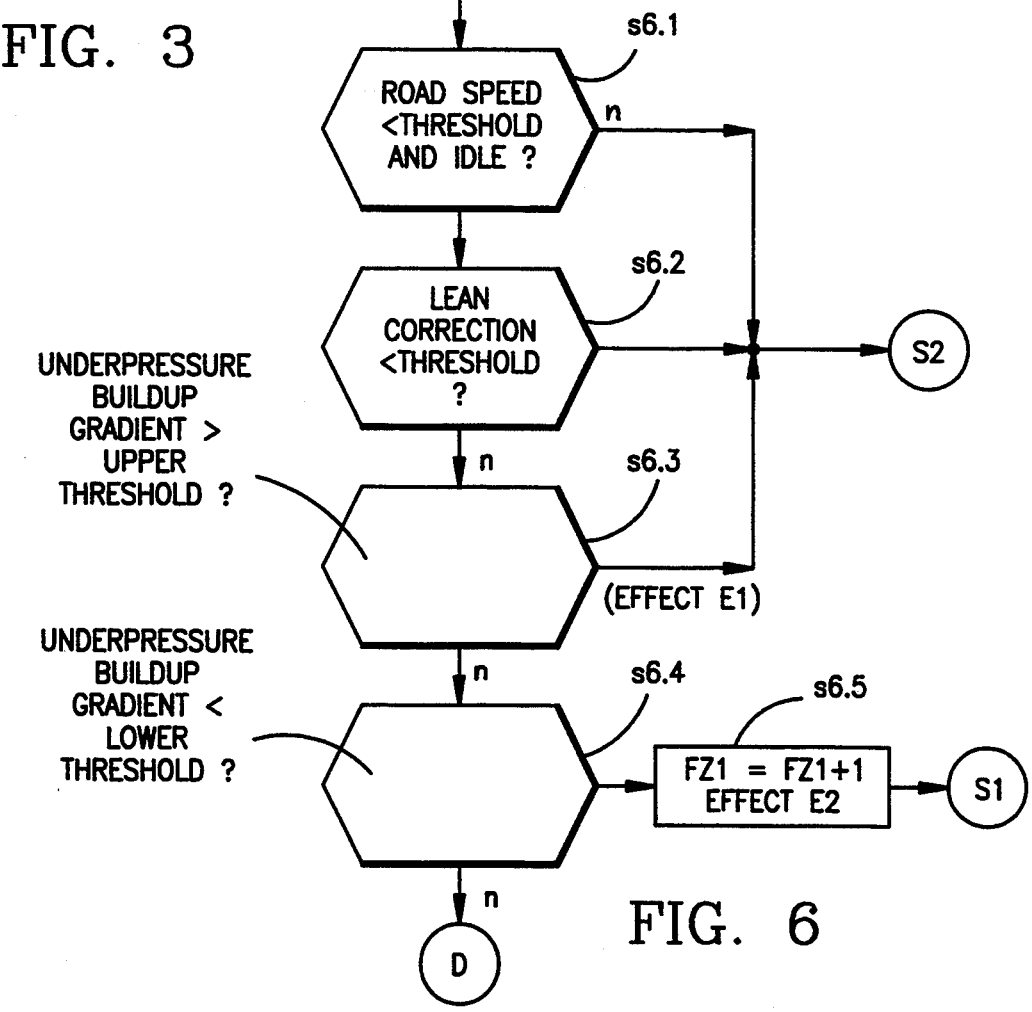
FIG. 5
FIG. 6

METHOD AND ARRANGEMENT FOR CHECKING THE OPERABILITY OF A TANK-VENTING SYSTEM

FIELD OF THE INVENTION

The following relates to a method and an arrangement for checking the operability of a tank-venting system on a motor vehicle having an internal combustion engine.

BACKGROUND OF THE INVENTION

From U.S. Pat. No. 5,193,512, a tank-venting system is known which has: a tank with a tank-pressure sensor; an adsorption filter, which is connected to the tank via a tank-connecting line and has a venting line blockable by a shutoff valve; and, a tank-venting valve which is connected to the adsorption filter via a valve line. The tank-venting system assembled in this manner is checked as to operability according to the following method: a check is made as to whether an operating condition is present, for example full load, in which no significant underpressure can be built up in the tank after closing the shutoff valve and opening the tank-venting valve; if such a condition is present, the method is interrupted; otherwise, the following steps follow: closing the shutoff valve; opening the tank-venting valve; measuring the underpressure building up in the tank; and, determining the tank-venting system as not operational if a pregiven underpressure is not reached.

In the mentioned publication, a variant of the method is also disclosed according to which the shutoff valve and the tank-venting valve are closed and a check is made as to whether a pregiven overpressure builds up within a pregiven time span because of vaporizing fuel. If this is the case, the tank-venting valve is opened and a check is made whether a lambda control on the internal combustion engine has to carry out a lean correction. If this is the case, the tank-venting system is determined as being operational.

The arrangement described in the above-mentioned publication for checking the operability of a tank-venting apparatus includes units for performing the above-mentioned steps.

It has been shown that it is not possible to determine relatively small holes in the tank-venting apparatus with the method mentioned above. Accordingly, the problem existed to provide a method and an arrangement for checking the operability of a tank-venting apparatus on a motor vehicle having an internal combustion engine with which it is possible to also reliably determine relatively small holes.

SUMMARY OF THE INVENTION

The method of the invention for checking the operability of a tank-venting apparatus configured as described above on a motor vehicle equipped with an internal combustion engine includes the following steps:

checking operating variables of the motor vehicle including the engine and tank-venting apparatus and interrupting the check when pregiven operating variable values are not obtained for which values a reliable statement as to operability is possible;

closing the shutoff valve;

opening the tank-venting valve;

measuring the underpressure developing in tank;

checking operating variables of the motor vehicle which can be measured only during the test method including the engine and tank-venting apparatus and interrupting the check of the development of underpressure when the operating variable values show that the measured tank pressure values permit no reliable statement as to the operability of the apparatus;

determining the apparatus as being inoperable at that time and terminating the method when the gradient of the underpressure buildup lies below a threshold;

closing the tank-venting valve;

measuring the underpressure decaying in the tank;

checking operating variables of the motor vehicle which can only be measured during the test method including engine and tank-venting apparatus and interrupting the check of the decay of underpressure when the operating variable values indicate that the measured tank pressure values permit no reliable information as to the operability of the apparatus;

determining the apparatus as being inoperable at that time when the gradient of underpressure decay lies above a threshold, otherwise, determining the apparatus as being operable at that time; and, opening the shutoff valve and terminating the method.

What is essential for the method of the invention is that it is interrupted when values of operating variables, which can be measured only during the method, indicate that the method cannot supply a reliable statement. In addition, values of operating variables can still be monitored in a conventional manner with these operating variables being measurable already at the start of the method. Preferably, the monitored operating variables are especially those which are related to a gassing of the fuel. This is for the following reasons.

The buildup of underpressure in the tank is caused in that the shutoff valve is closed and the tank-venting valve is opened. If a line between the tank-venting valve and the tank is blocked or if a leak is present at any location, then an underpressure builds up only slowly and/or to a reduced extent. A conclusion as to inoperability can be made from an inadequate development of underpressure within a pregiven time span if a significant disturbance source could not lead to similar measuring effects. This significant disturbance source is the development of fuel vapor irrespective of whether from heat or especially from the movement of the tank content. When the fuel generates gas relatively intensely or vaporizes, then an underpressure of pregiven magnitude does not build up within a pregiven time span even when the tank-venting apparatus is tight and is not blocked at any location. This source of error is avoided with great reliability with the method of the invention.

As long as the tank-venting valve is opened, fuel vapor, which has developed in larger quantities and is therefore disturbing, can be determined by a lean-correction check. As mentioned initially, a lean correction check is also carried out in the known method. There, when the determination of the lean correction is made, a conclusion as to the operability of the apparatus is made; whereas, in the method of the invention, the method is interrupted without a statement being made as to the operating condition of the apparatus.

Very small holes can be determined especially by checking the decay of underpressure after the closure of the tank-venting valve when, as before, the shutoff valve is closed. For a tight tank-venting apparatus and non-vaporizing fuel, underpressure decays relatively slowly. For a vaporizing fuel and/or a hole in the apparatus, a relatively rapid decay of underpressure is observed. Since the check as to a hole is falsified because of fuel vapor which develops, then the method is again interrupted when gas escapes from the fuel. In contrast to the test sequence when the tank-venting valve is opened, a vaporizing fuel cannot be determined by a lean correction. Ancillary operating variables are therefore checked which permit a conclusion to be drawn as to gas-developing fuel, preferably fluctuations in the underpressure or increases of the gradient of the underpressure decay. Such effects point to a moving tank content, that is, sloshing fuel and therefore probably fuel which is developing gas. A movement of the tank content occurs always when the corresponding motor vehicle accelerates. If acceleration sensors are provided on the vehicle, for example, for a road-position control, then the signals of these sensors can also be used in order to draw a conclusion as to the presence of sloshing tank content and the method for checking the tightness of the tank-venting apparatus is interrupted as required.

Overpressure in the tank-venting apparatus when the tank-venting valve is closed and the shutoff valve is closed also points to a gas-developing fuel. An overpressure check can take place without difficulty especially in the so-called base adaptation phases wherein the tank-venting valve is anyway closed. No check as to leaks, at least no check as to small leaks, is carried out when the overpressure exceeds a threshold, for example, 5 hPa, and the base adaptation phase is preferably immediately interrupted. The check as to small leaks is only carried out when no pressure exceeding the threshold is present and the overpressure check has occurred less than a pregiven time span, for example 5 minutes, previously. If an overpressure is only determined in an overpressure check following within a pregiven time span after the small-leak check, then the procedure is followed that perhaps a result is recognized which announced a larger leak. Other leak results are however disregarded.

The check as to the buildup of an underpressure is advantageously only then initiated when the engine is running at idle and a drive signal indicates that the motor vehicle is standing or is moving only slowly. This signal combination ensures, on the one hand, a reliable underpressure buildup (because of low intake pipe pressure at idle) and, on the other hand, minimal disturbance because of moved and therefore gas-developing fuel (because the motor vehicle is essentially not moving). The check as to whether these conditions are satisfied is preferably carried out during the entire test sequence and the method is interrupted as soon as these conditions are no longer satisfied. In a simplified embodiment, it is sufficient to check only one of the two conditions. However, it must be ensured that an engine operating condition is present especially during the underpressure buildup phase for which an intake pipe pressure is present which is sufficiently low for a test.

It is furthermore noted that the trace of the pressure is dependent not only upon the intake pipe pressure and possibly on gas-generating fuel, but also on the fill level of the tank. If the tank is substantially filled, then for a closed shutoff valve and a closed tank-venting valve (that is for a test as to the decay of underpressure), a very small quantity of fuel vapor is sufficient to considerably reduce the underpressure in a short time. A high underpressure-decay gradient points to a hole in the apparatus. The method is therefore oversensitive when the tank is full. To avoid this oversensitivity, the method according to the invention is preferably then interrupted when the check as to underpressure buildup points to a high gradient. This high gradient while underpressure builds up points to a full tank. In lieu thereof, the fill level can also be checked by an appropriate sensor and the method is not even started when the tank is too full.

The arrangement according to the invention includes units for carrying out the steps of the method of the invention, namely, a valve-control unit, a sequence control for driving the valve-control unit, a pressure gradient check unit serving as an operating-state determination unit and an evaluation unit.

BRIEF DESCRIPTION OF THE DRAWINGS

FIG. 3 is a flowchart for an initialization method;

FIG. 5 is a flowchart for checking the start conditions;

FIG. 6 is a flowchart concerning the check of interrupt conditions during underpressure buildup;

DESCRIPTION OF THE PREFERRED
EMBODIMENTS OF THE INVENTION

Figure 1:
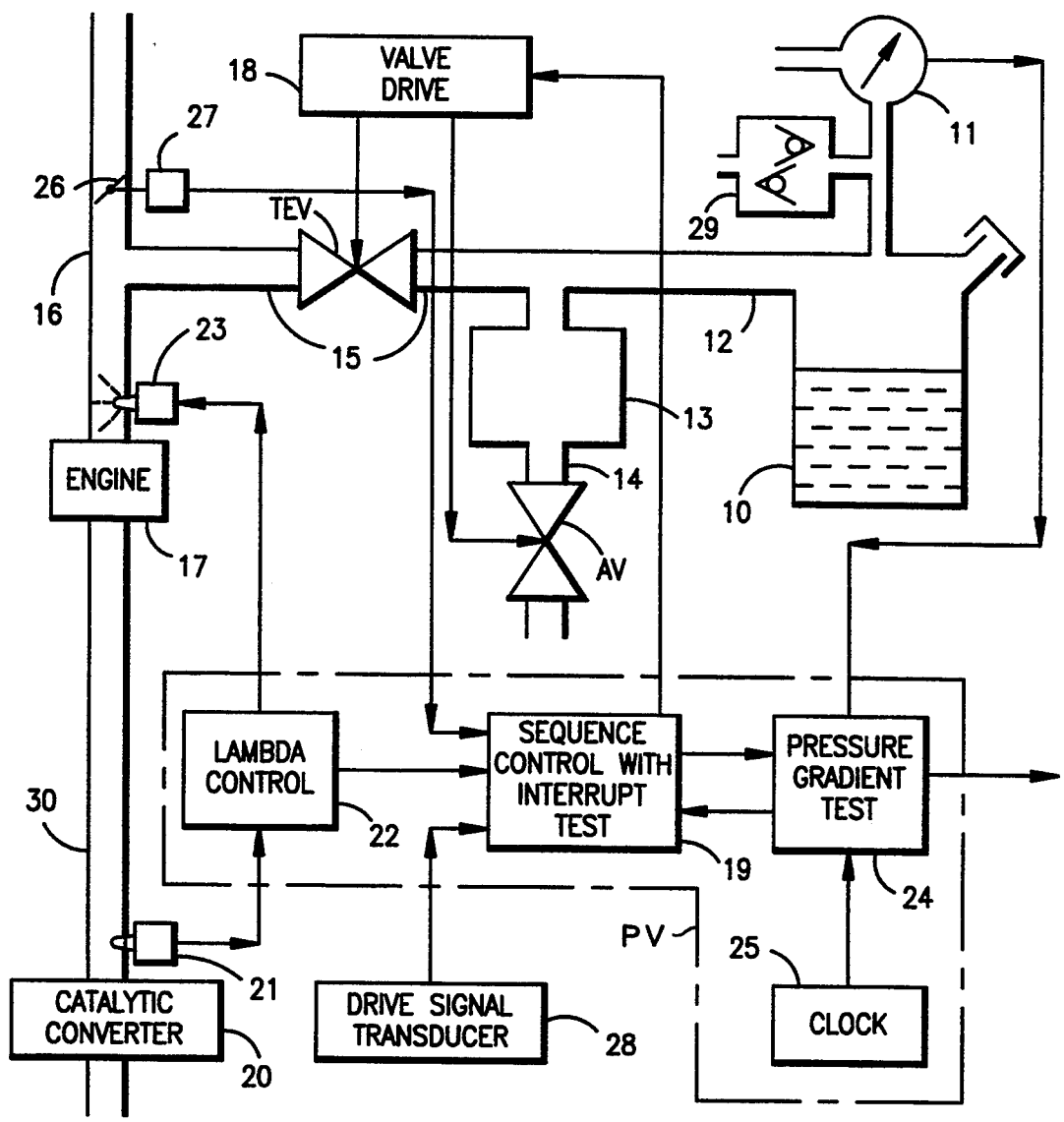
FIG. 1 is a schematic representation of an engine having an intake pipe, exhaust-gas channel and catalytic converter, a tank-venting apparatus with a shutoff valve and an adsorption filter and pressure sensor on the tank and a control device with units for checking the pressure gradient and for controlling the sequence with an interrupt check for checking the operability of the tank-venting apparatus.

The tank-venting apparatus shown in FIG. 1 includes a tank 10 having a difference-pressure sensor 11, an adsorption filter 13 connected to the tank via a tank-supply line 12 and a tank-venting valve TEV. The adsorption filter has a venting line 14 with a shutoff valve AV inserted therein. The tank-venting valve TEV is inserted in a valve line 15 which connects the adsorption filter 13 to the intake pipe 16 of an internal combustion engine 17. The tank-venting valve TEV and the shutoff valve AV are driven by a valve-control unit 18 at least in dependence upon the signal of a sequence-control unit 19. The tank-venting valve TEV is driven also in dependence upon the operating state of the engine 17, this is however not shown in FIG. 1.

A catalytic converter 20 is arranged in the exhaust-gas channel 30 of the engine 17 with a lambda probe 21 disposed forward of the catalytic converter. The lambda probe 21 supplies a signal to a lambda-control unit 22 which, from this signal, determines an actuating signal for an injection unit 23 in the intake pipe 16.

A determination of the tank-venting apparatus as being operable or not takes place with the aid of a pressure-gradient check unit 24 in a check device PV which is part of a control apparatus. The check device includes also the sequence-control unit 19 referred to above, the lambda-control unit 22 as well as a clock 25. The control apparatus includes additional function groups not shown.

The sequence-control unit 19 starts a sequence for checking the operability of the tank-venting apparatus as soon as an idle-signal transducer 27 indicates idle and a drive-signal transducer 28 indicates standstill or slow movement of the corresponding motor vehicle. The idle signal transducer 27 coacts with the throttle flap 26 of the engine. The lambda-control unit 22 receives, as already mentioned, the output signal of the lambda probe 21. The test arrangement PV supplies an evaluation signal and a control signal as output signals. The evaluation signal is supplied by the pressure-gradient check unit 24 and indicates whether the tank-venting apparatus is operable or not. The control signal is supplied from the sequence-control unit 19 to the valve-control unit 18.

Within the test arrangement, the sequence control is supplied with signals from the already-mentioned lambda-control unit 22, the pressure-gradient check unit 24 and is also supplied with the idle signal from the idle-signal transducer 24 and the road-speed signal from the drive-signal transducer 28. The sequence control emits the already-mentioned control signal to the valve-control unit 18 and status signals to the pressure-gradient check unit 24. In addition to the last-mentioned data signals, the pressure-gradient check unit 24 receives also signals from the clock 25 and from the difference-pressure sensor 11.

Figure 2:
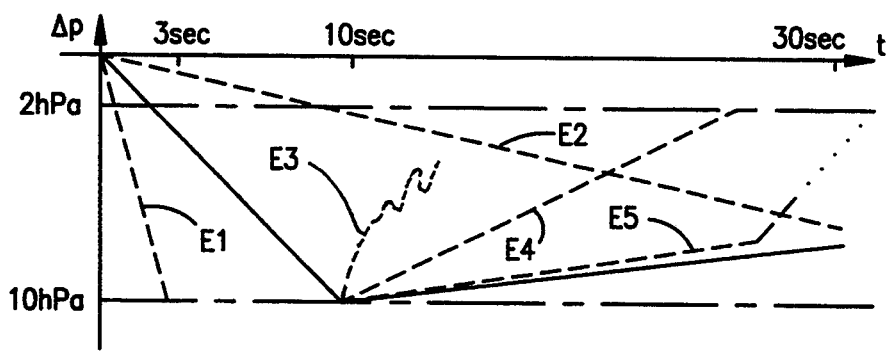
FIG. 2 shows time-dependent pressure traces in the tank in dependence upon various operating conditions.

The check arrangement PV built up in this manner is so configured that it performs a method which first is explained in an overview with respect to the diagram of FIG. 2 and then in greater detail with respect to the flowcharts of FIGS. 3 to 10. A check of the underpressure buildup and the underpressure decay is thereby carried out. A protective valve 29 is provided on the tank 10 so that the tank 10 cannot be destroyed by underpressure or overpressure when there are operating faults.

The sequence control 29 starts a test method when an operability check is to be carried out and the idle-signal transducer 27 announces idle and the drive-signal transducer 28 indicates a road speed below a pregiven threshold. For this purpose, the sequence control 29 blocks the shutoff valve AV and opens the tank-venting valve TEV. Now, within a pregiven time span, a pregiven minimum underpressure should build up. In the embodiment, the time span in which at least 10 hPa was reached amounted to a maximum of 30 seconds. This applied in the case of an almost empty tank and a pulse-duty factor for the tank-venting valve of 25%. A different minimum pressure to be reached and a different maximum permissible time span can be pregiven in dependence upon the overall configuration of the tank-venting apparatus (especially the volume of the apparatus) and in dependence upon the time-dependent trace of the drive of the tank-venting valve.

In FIG. 2, a pressure drop is shown by the solid line according to which a minimum pressure of 10 hPa takes place within 10 seconds. Two other falling lines are shown as broken lines. One of the lines relates to an effect E1 according to which the above-mentioned 10 hPa underpressure is reached within 3 seconds. This is an indication for a substantially filled tank and an apparatus which is probably operable or is burdened with only a small hole. If a small hole is indeed present can only be determined with the aid of a subsequent underpressure decay test. Since the underpressure decay, however, reacts very sensitively to disturbances when the tank is full, no further investigation is undertaken in the case of a trace according to the effect E1; instead, there is a delay until the underpressure buildup has a flatter trace, that is, until the tank is not as full.

The other broken falling line relates to an effect E2 having a very slight underpressure buildup gradient. After 30 seconds only approximately 5 hPa underpressure is reached. This is an indication for an apparatus which leaks assuming that the fuel in the tank does not develop gas too intensely. In order to preclude the just-mentioned source of error, a check is made during the time that the tank-venting valve TEV is opened as to whether the lambda-control unit 22 has to carry out a lean correction. If this is the case, then the sequence-control unit 19 immediately ends the test sequence.

As soon as the underpressure buildup check is completed and the test method is to be continued, the tank-venting valve TEV is closed by the sequence-control unit 19 via the valve-control unit 18. The underpressure should now slowly drop. This is shown in FIG. 2 by the solid line which rises slightly. A leak appears to be present when, in contrast, the underpressure decay gradient is steeper such as because of the effects E3 and E4 in FIG. 2 indicated by the rising broken lines. However, this is not clearly the case since the fuel can suddenly begin to generate gas even though it did not do this in the previous underpressure buildup phase or hardly did so in this phase. Sudden development of gas is, however, only possible because of a movement of the tank content. This can be recognized primarily by pressure fluctuations for a tank which is almost full, that is, by the effect E3 according to FIG. 2. In addition, an effect E5 is possible wherein a sudden increase of the pressure decay gradient occurs which can be only caused by a fuel which suddenly develops gas since otherwise, the pressure decay gradient must become continuously less. (In FIG. 2, linear in lieu of actual exponential pressure traces are shown for simplicity). If one of the effects E3 or E5 is determined, then it is assumed that no reliable statement as to the operability of the apparatus is possible and, for this reason, the test method is interrupted. If in contrast, a relatively rapid underpressure decay according to effect E4 is present without fluctuations and gradient increase, then the conclusion can be drawn as to a leak in the apparatus.

Figure 7:
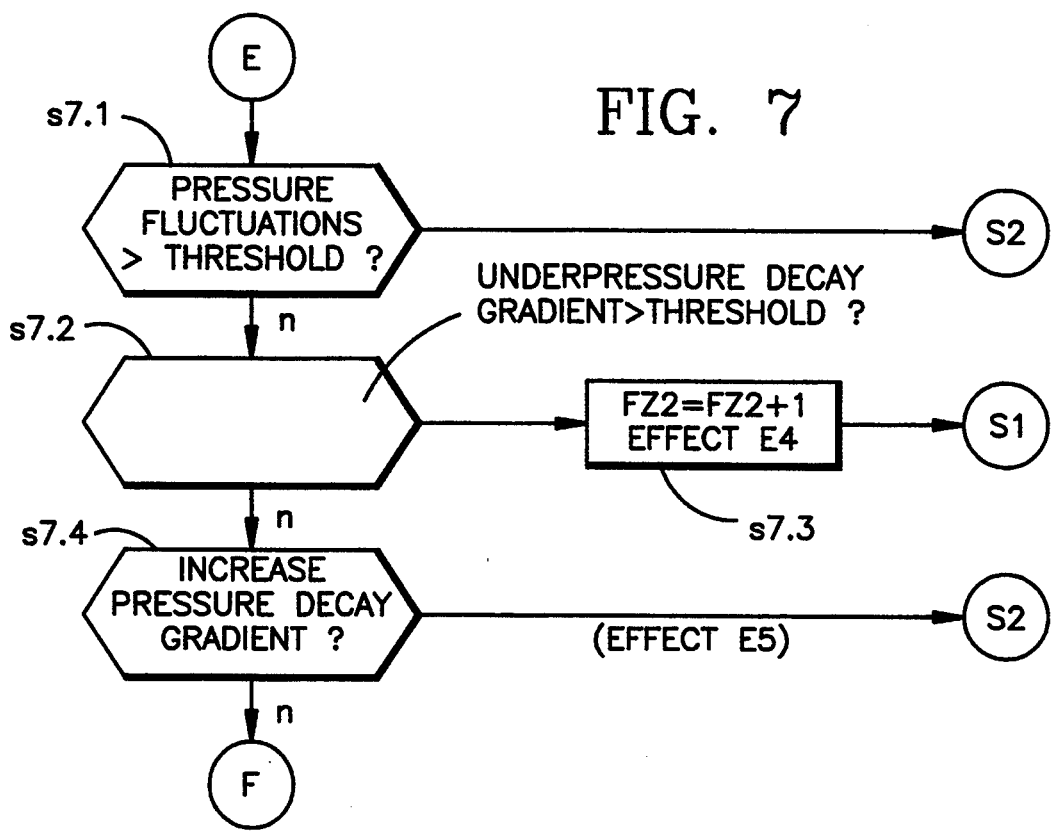
FIG. 7 is a flowchart relating to the check of interrupt conditions during underpressure decay.
Figure 8:
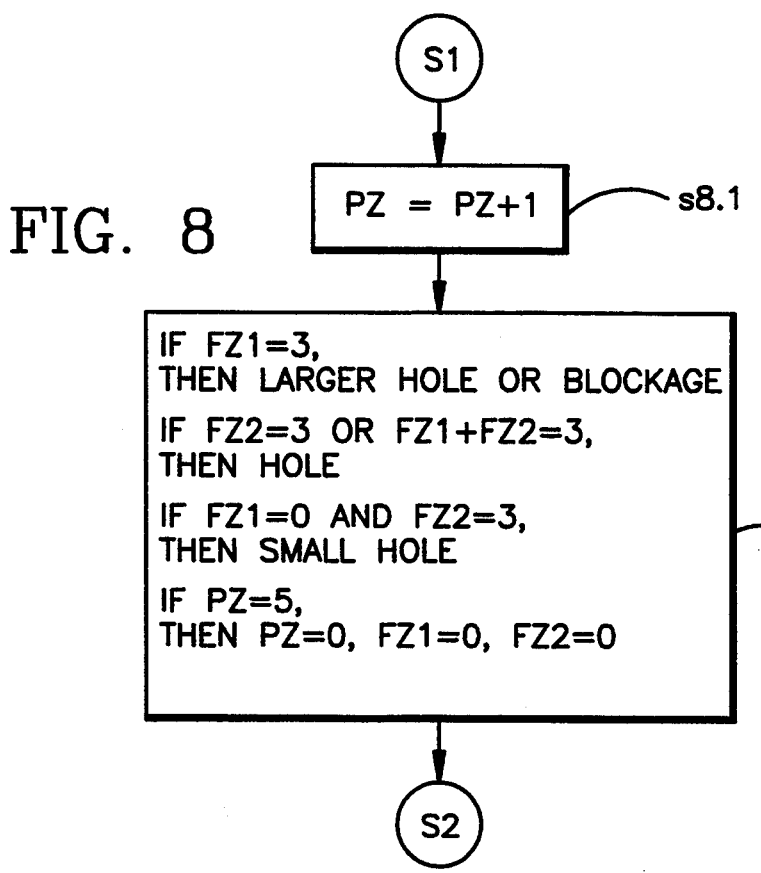
FIG. 8 is a flowchart concerning fault evaluation.

For the method as explained in detail with respect to FIGS. 3 to 10, it is assumed that the evaluation signal BS, as it is emitted by the test arrangement PV, indicates whether a fault flag FFL (fault) is set or not (no fault). The flag is reset when the motor vehicle is delivered with the tank-venting apparatus. Such a reset also takes place when, after a check at the service station, an error in the tank-venting apparatus has been eliminated after an announcement by a set flag. The check method for determining faults takes place several times in each operating cycle of the engine but not continuously. When n completely carried out test sequences indicate a fault at least m times, the apparatus is determined to be non-operable and the fault flag FFL is set. For this purpose, various counters must be initialized at the start of an operating cycle and the counters must be evaluated at the end of each test sequence (FIG. 8).

According to FIG. 3, and after the engine 17 is started, a check is made in step s3.1 as to whether the engine is warm. If this is not the case, then a first fault counter FZ1, a second fault counter FZ2 and a check-number counter PZ are all set to zero in step s3.2. Otherwise, that is for a warm engine, the end of the initialization method is reached immediately without the initialization being performed. This is the case so that not all previous test results are lost with each engine start within a single operating cycle (warm engine).

Figure 4A:
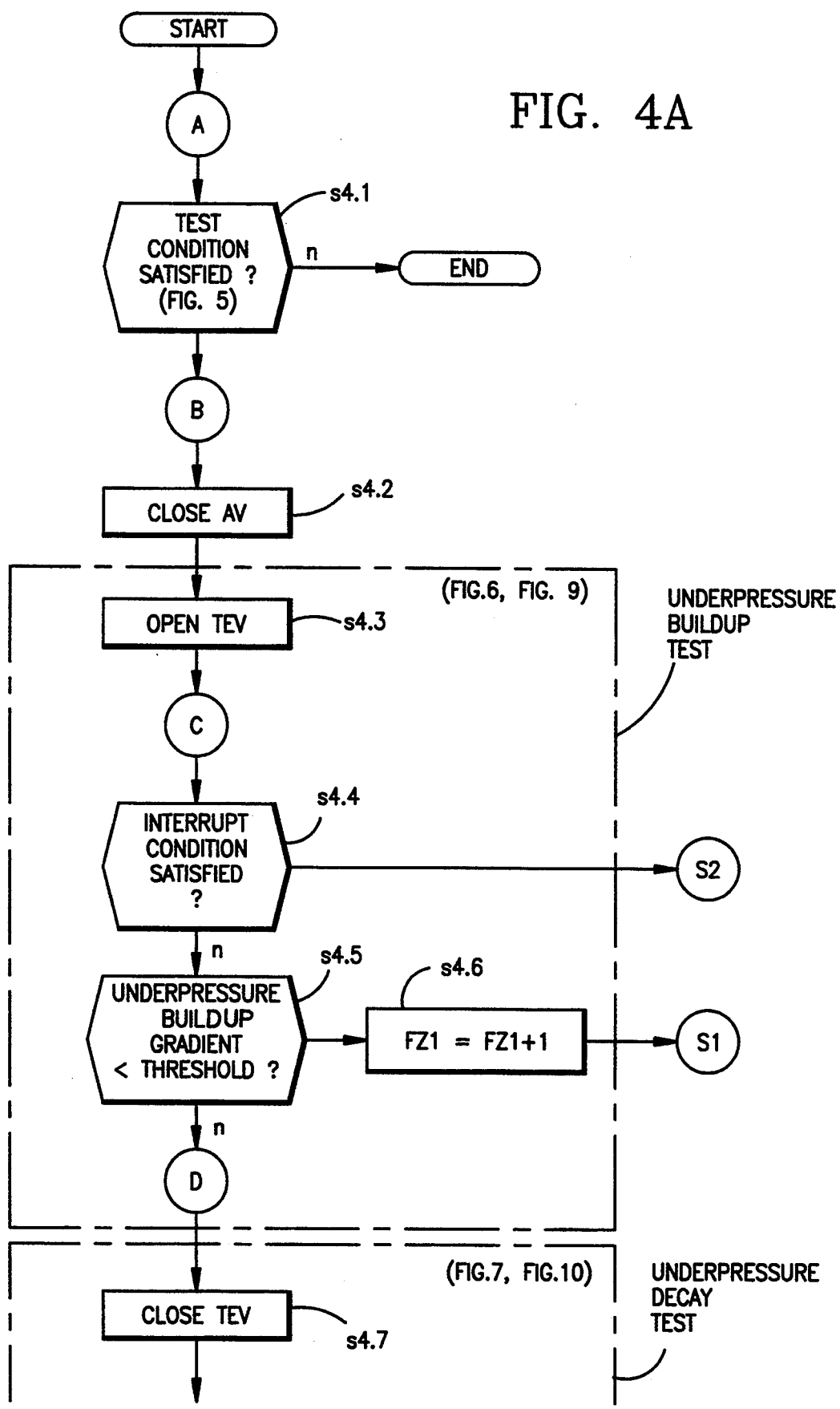
FIGS. 4A and 4B show a flowchart for a method for checking the operability of a tank-venting apparatus wherein interrupt conditions are checked during the pressure buildup and during the pressure decay in the tank.
Figure 4B:
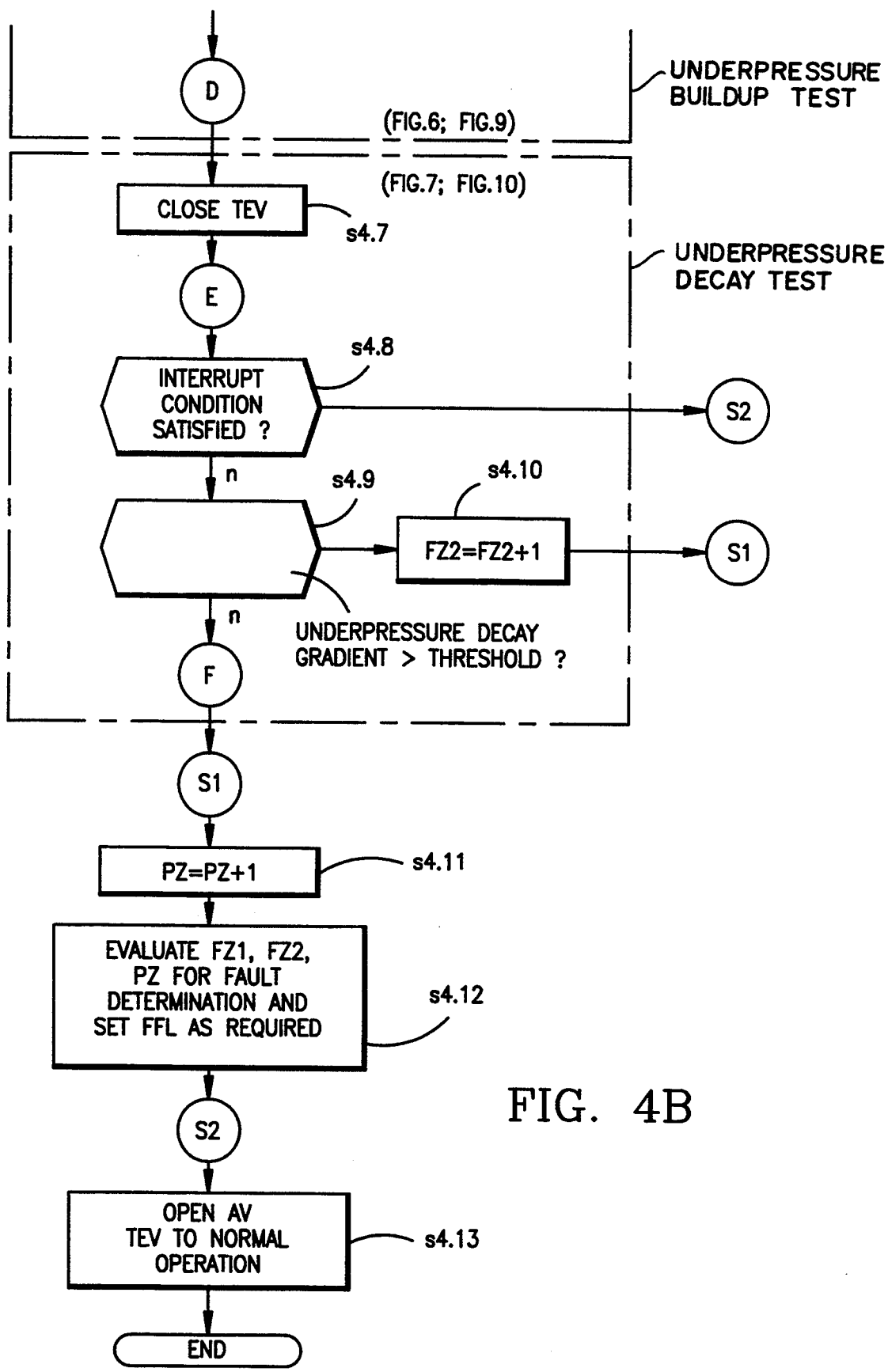

After the initialization sequence of FIG. 3, a test sequence according to FIG. 4 takes place several times. In this test sequence, via a mark A a step s4.1 is reached in which a check is made as to whether a condition is satisfied which shows whether a subsequent underpressure buildup check and an underpressure decay check are at all purposeful. Details therefor are provided in connection with FIG. 5. If the condition is not satisfied, then the method is ended immediately. Otherwise, a step s4.2 is reached via a mark B wherein the shutoff valve AV is closed. An underpressure buildup check follows with steps s4.3 to s4.6. First, the tank-venting valve TEV is opened (step s4.3) and then a check is made in step s4.4 as to whether an interrupt condition is satisfied. Step s4.4 is reached via a mark C. If this is the case, then a mark S2 is reached after the end of the method. Otherwise, step s4.5 follows wherein a check is made as to whether the underpressure buildup gradient in the tank lies below a threshold, that is, whether the effect E2 of FIG. 2 is present. If this is the case, then the first fault counter FZ1 is incremented in step s4.6 and a mark S1 is reached near the end of the method but before the mark S2. Otherwise, a mark D follows.

If the above-mentioned mark D is reached, then an underpressure decay check follows this mark with steps s4.7 to s4.10. In step s4.7, the tank-venting valve TEV is again closed whereupon the step s4.8 follows via a mark E. In this step s4.8, a check is made as to whether an interrupt condition is satisfied. If yes, then mark S2 is again reached, otherwise a check is made in step s4.9 as to whether the underpressure decay gradient lies above a threshold, that is, if the effect E4 is present. If this is the case, then the second counter FZ2 is incremented in step s4.10 and the mark S1 is reached. Otherwise, a mark F follows.

The already-mentioned mark S1 is reached after the underpressure-decay check. Reaching mark S1 shows that a check sequence without interruption has been carried out. Therefore, the check counter is incremented in step s4.11. Thereafter, (step s4.12), the counter positions of the fault counters FZ1 and FZ2 as well as the test-number counter PZ are evaluated for a fault determination in order that the flag FFL be set in the case of a fault. The mark S2 then follows which is reached also in the case of an interruption of the underpressure buildup check or of the underpressure decay check. Thereafter, the shutoff valve AV is opened in step s4.13 and the tank-venting valve TEV is transferred to normal operation. This ends the method.

In the embodiment, step s4.1 includes the substeps s5.1 and s5.2. Accordingly, it is first checked whether the fault flag FFL has already been set. If this is the case, it is no longer necessary to carry out a check since it has already been determined that the tank-venting apparatus is not fully operational. The end of the method is therefore reached directly. In lieu of carrying out this step, the following procedure can, for example, be carried out in that in a fault memory, fault flags are interrogated sequentially and only those test routines are started for which a clear result is not already present. Then, for a set tank-venting apparatus fault flag, none of the methods described here is reached. However, if no error is present, then a check is made in step s5.2 as to whether the road speed lies below a threshold and whether idle is present. In idle, a rather intense underpressure is present in the intake pipe 16 which has as a consequence that even for a tank which is almost empty, a relatively short test time is obtainable for the underpressure buildup test. Furthermore, the lambda control reacts in idle with great sensitivity to fuel which is supplied from the tank-venting apparatus. In this way, a reliable determination is made as to whether the fuel is generating gas. If this is the case, then a falsification of the test result must be feared since it is not clear whether pressure gradients are caused by gassing fuel or by air which penetrates through a small hole. The method is ended since, in this case, no reliable statement is possible. The check of the road speed goes in the same direction. Thus, if the road-speed signal supplied by the drive-signal transducer 28 lies above the checked threshold, then it is to be feared that the tank content is moved relatively intensely and therefore the fuel is generating gas because of the movement. For especially reliable measurements, it can be required that the road-speed signal should be zero and that this value be maintained for a pregiven time span. Then it is certain that the tank content is completely quiet. However, this requires a drive-signal transducer which detects even the slowest speeds. However, this is not the case in practice. Therefore, in practice, it is more purposeful to permit a specific quantity of the road-speed signal and to detect possible movements of the tank content by other means. In this respect, reference can be made to the sequence of FIG. 10.

The sequence of FIG. 5, with which a decision is made as to whether a check as to leakage should be carried out at all, can further contain a step for an overpressure check. With sequences having a base adaptation phase, this check preferably takes place in one such phase. The tank-venting valve and the shutoff valve are closed for making an overpressure check and an investigation is made as to whether the pressure increases above a threshold, for example 5 hPa, within a pregiven time span of several seconds up to a few ten seconds. If no pressure above this threshold is determined and if the next check for small leaks is possible within a pregiven time span such as 5 minutes, then this next check is carried out. A check as to larger leaks can also be carried out in a reliable manner with greater delay. Tank-venting is preferably undertaken immediately if the pressure threshold is exceeded. As a stricter condition, the precondition can be set that idle and essentially no movement of the vehicle is present so that the overpressure check can be carried out whereupon, for a positive result, the small leak check can take place.

Steps s6.1 to s6.5 of FIG. 6 lie between the marks C and D. Since the content of these steps is given in detail in the flowchart of FIG. 6 and details as to the contents of all steps have already been explained, a detailed description of FIG. 6 is not undertaken. The same applies to the method steps s7.1 to s7.4 of FIG. 7 which take place between the marks E and F of FIG. 4.

It should be noted that the interrupt conditions of steps s6.3, s7.1 and s7.4 can be slightly modified. In step s6.3, it is important that a tank which is quite full be detected. This can take place either by utilizing the effect E1 as described with respect to FIG. 2 or the $\Delta p$ signal of a reliable tank level sensor can be used. In contrast, in steps s7.1 and s7.4, it is important to interrupt the method when gas-developing fuel is to be feared because of relatively intense movement of fuel. Instead of as in FIG. 7, here the procedure can be followed that an inquiry is made as to whether the motor vehicle was accelerated above a threshold in the event that acceleration sensors are present or it can be required that the motor vehicle came to standstill within a pregiven time span.

The steps s8.1 and s8.2 of FIG. 8 correspond to the steps s4.11 and s4.12 of FIG. 4 with, however, step s8.2 being more detailed than step s4.12. The test-number counter PZ and the fault counters FZ1 and FZ2 are set to zero whenever five test sequences (counter position PZ=5) have been passed through without the fault flag FFL having been set. When a fault during the underpressure buildup check has been determined three times within this number of test sequences (FZ1=3), this shows that a larger hole in the apparatus is present or that the apparatus is obstructed. Correspondingly, and as in step s8.2, other faults can be concluded from other counter positions. It is here noted that it serves no purpose to distinguish the different faults for only a single fault flag FFL since it can only be determined whether a fault has occurred or not. It is sufficient to check whether the sums of the counter positions of the two fault counters FZ1 and FZ2 have reached the value "3" within five check sequences. If different fault cases are distinguished, then a corresponding amount of fault flags are to be used.

The sequence of step s8.2 can be made more precise with the aid of an overpressure check corresponding to that in connection with FIG. 5. If, within a pregiven time span after the check for leakage, an overpressure check was not completed at a pressure of below a threshold such as again 5 hPa, then the counters FZ2 and FZ3 are again decremented in the event that they were previously incremented. Flags must then be present to make the incrementation, which had previously taken place, recognizable. These flags are again reset after step s8.2. The value of the counter FZ1 can however be retained since this indicates a hole or a blockage, that is, faults which can be distinguished clearly from disturbances.

Figure 9:
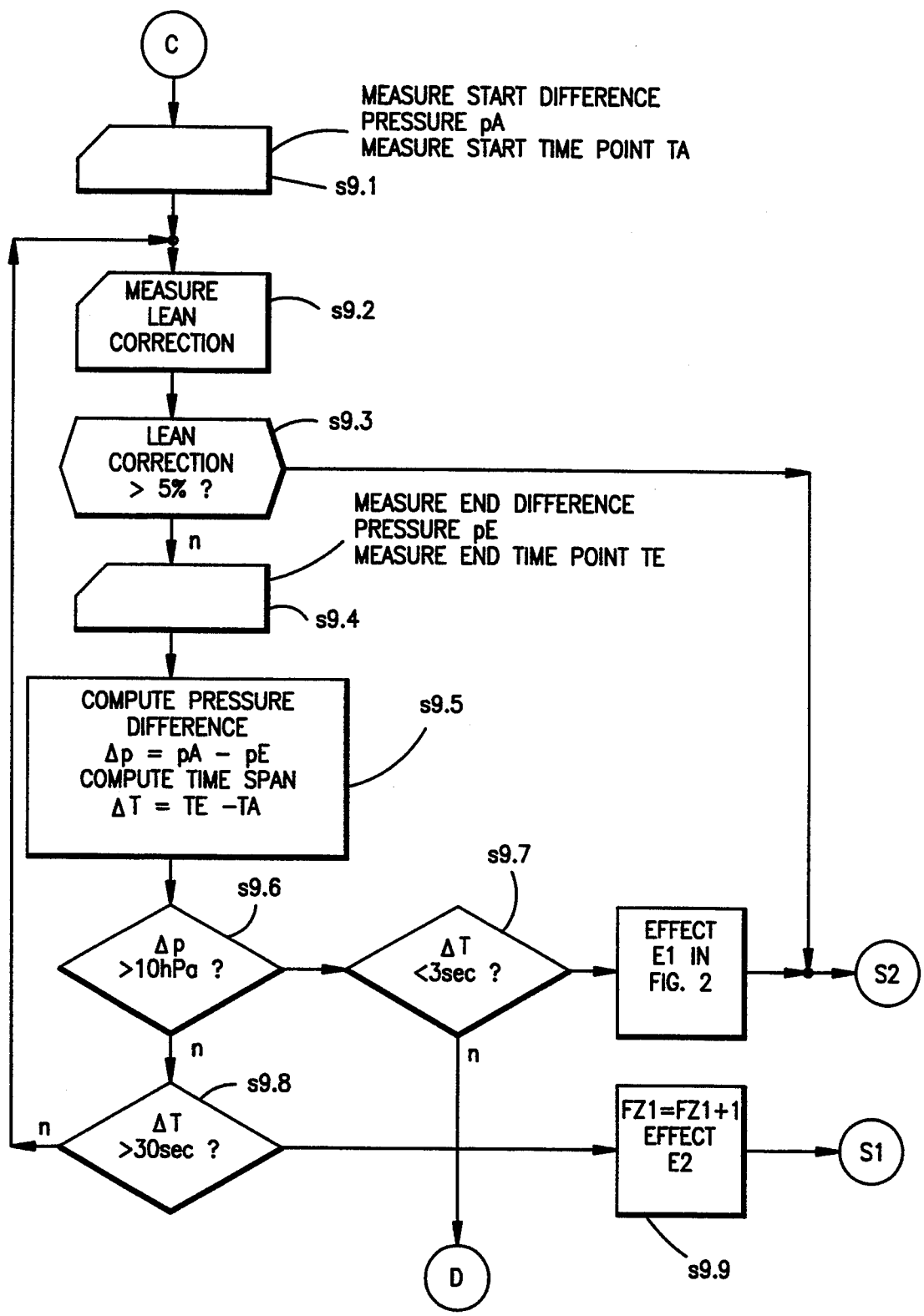
FIG. 9 is detail flowchart for the sequence of FIG. 6.

FIG. 9 shows in detail an embodiment of a method sequence between the marks C and D in FIG. 4 and FIG. 6. In a step s9.1, a start time point TA and a start difference pressure pA in the tank are measured. Thereafter, in step s9.2, measurements are made as to which lean correction the lambda control unit 22 undertakes. The step s9.2 is the first step of a loop. If it is shown in step s9.3 that the lean correction is greater than 5%, then the mark S2 is reached. Otherwise, the end time point TE and the end difference pressure pE are measured in step s9.4 and the pressure difference $\Delta p$ and the time span $\Delta T$ are computed in step s9.5. The time span $\Delta T$ is the time which passes since the measurement of the start difference pressure. The value pA−pE is used as the pressure difference $\Delta p$ in order to obtain a positive value. Then, in a following step s9.6, a check is made directly as to whether the pressure difference $\Delta p$ lies above 10 hPa. If this is the case, then a check is made (step s9.7) as to whether the time span $\Delta T$ is less than 3 seconds. If this is the case, then the effect E1 of FIG. 2 is present. Otherwise, the underpressure buildup test is positively completed by reaching the mark D.

If it results in step s9.6 that the difference pressure $\Delta p$ has not yet exceeded the required 10 hPa, then a check is made in step s9.8 as to whether the maximum permissible time span $\Delta T$ of 30 seconds has already been exceeded. If this is not the case, the above-mentioned loop is again run through starting at step s9.2. Otherwise, the first fault counter is incremented in a step s9.9 since effect E2 has been determined in FIG. 2.

Figure 10:
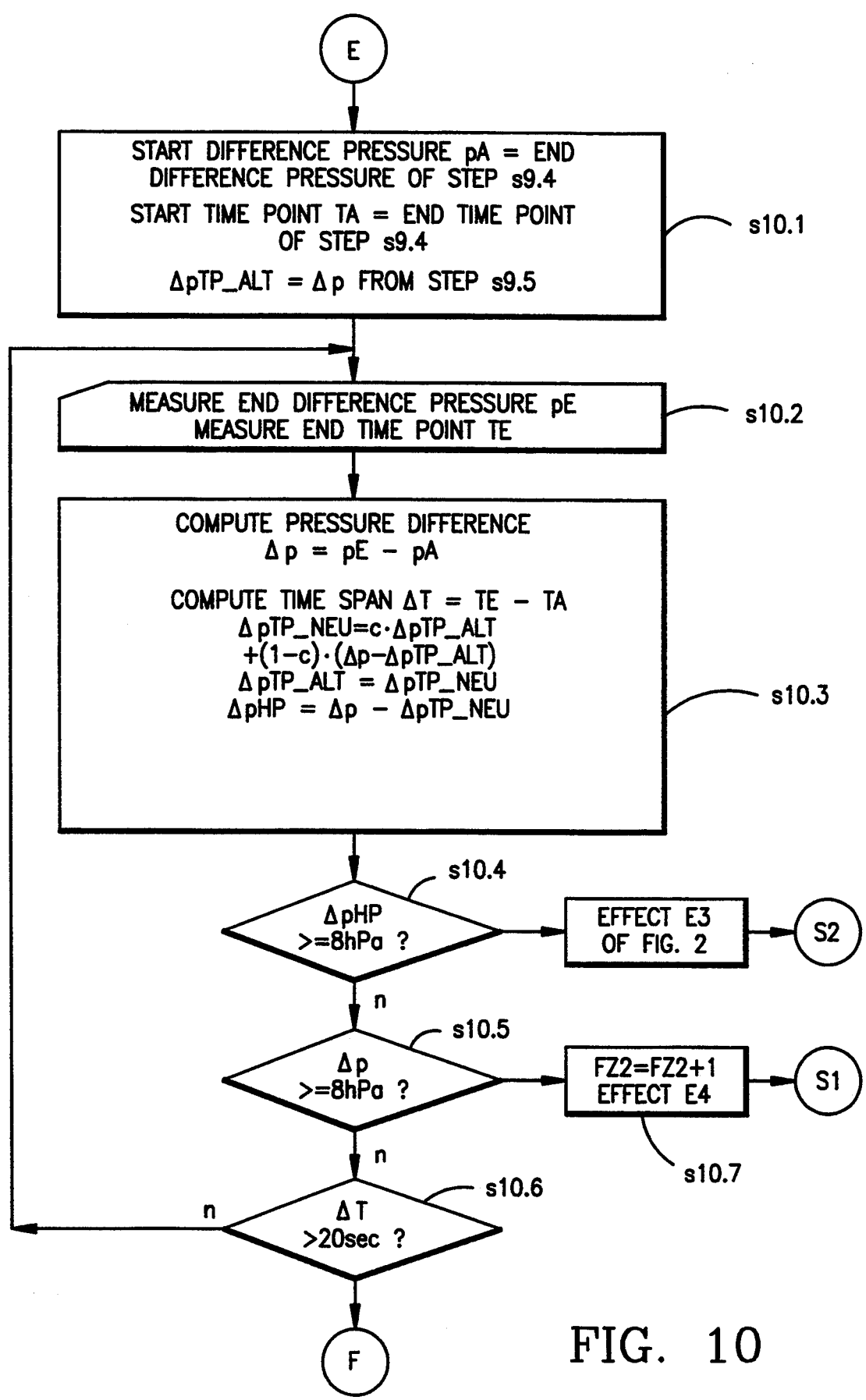
FIG. 10 is detail flowchart for the sequence of FIG. 7.

FIG. 10 shows in detail an embodiment for the sequence between the marks E and F of FIGS. 4 and 7. Before reaching a loop, a start difference pressure pA and a start time point TA are determined in a step s10.1 in correspondence to FIG. 9. This takes place in that the corresponding end values from step s9.4 are used. Furthermore, a low-pass value $\Delta pTP\_ALT$ for the low-pass averaged difference pressure is set to the value $\Delta p$ from step s9.5. Thereafter, the end difference pressure pE and the end time point TE are measured in step s10.2 as a first step of the above-mentioned loop. A computation of several values takes place in step s10.3. First, the pressure difference $\Delta p$ and the time difference $\Delta T$ are again determined. This time, the pressure difference $\Delta p$ is computed as pE−pA in order to again obtain a positive value. Furthermore, a high-pass value $\Delta pAP$ of the pressure difference $\Delta p$ is determined which deviates significantly from zero when larger fluctuations are present in the pressure difference. This high-pass value is determined by subtracting a low-pass value $\Delta pTP\_NEU$ from the determined pressure difference $\Delta p$. The low-pass value $\Delta pTP\_NEU$ is computed by a sliding averaging with the aid of a constant c which is so computed that a time constant of approximately 20 milliseconds is adjusted. The constant c has a value of approximately 0.9 when the above-mentioned loop is processed with step s10.3, for example, every 20 msec. The computation results from entries in step s10.3.

In step s10,4, a check is made as to whether the high-pass filtered pressure difference $\Delta pHP$ lies above a threshold. If this is the case, then the oscillations according to the effect E3 of FIG. 2 are present. For this reason, the method is interrupted via the mark S2. Otherwise, a check is made in step s10.5 as to whether a pressure difference of at least 8 hPa is present, that is, whether the underpressure of approximately −10 hPa has dropped to approximately −2 hPa. If this is the case, then an underpressure decay which is too rapid is present for a fuel which does not generate gas. For this reason, a conclusion is drawn as to the fault of effect E4 of FIG. 2, that is, an apparatus which is not tight. Therefore, the second fault counter FZ2 is incremented (step s10.7) and the evaluation of FIG. 8 is reached with the mark S1. If in contrast, it is determined in step s10.5 that the underpressure decay has not been too intense, a check is made in step s10.6 as to whether a time difference $\Delta T$ of more than 20 sec has elapsed. If this is not the case, the loop with the steps s10.2 to s10.7 is again processed. Otherwise, the mark F is reached which indicates that the underpressure decay test has run through without interruption and fault determination.

In addition, it has been shown to be useful if other tests than tank-venting diagnosis are interrupted when the measured tank pressure does not permit a reliable statement as to the operability of the apparatus.

This has the following background. The detection of sloshing is not only intended to blank out the tank-venting diagnosis but also, for example, the misfire detection (detection of a poor roadway).

Essential for all the above-described variations as well as for other further variations not here described is that the test as to operability can always then be interrupted when a gassing of the fuel is determined or at least assumed. In this way, it is ensured that even very small leaks can be reliably determined.

We claim:

1. A method for testing for the operability of a tank-venting apparatus on a motor vehicle having an internal combustion engine, the tank-venting apparatus including a tank having a tank pressure sensor, an adsorption filter and a venting line which is closable via a shutoff valve and a tank-venting valve, the adsorption filter being connected to the tank via a tank-supply line and the tank-venting valve being connected to the adsorption filter via a valve line, the method comprising the steps of:

checking operating variables of the motor vehicle including the engine and tank-venting apparatus and interrupting the method when pregiven operating variables are not reached for which a reliable statement as to operability is possible;

closing the shutoff valve;

opening the tank-venting valve;

measuring the underpressure building up in the tank; and, determining the operability of the tank-venting apparatus based on the measured tank pressure;

checking operating variables of the vehicle including engine and tank-venting apparatus and interrupting the underpressure buildup check when the operating variable values indicate that the measured tank pressure values do not permit a reliable statement as to the operability of the apparatus, the operating variables being measured only during the test method;

determining the apparatus as inoperable at that time and terminating the method when the underpressure buildup gradient lies below a threshold;

closing the tank-venting valve;

measuring the underpressure decaying in the tank;

checking operating variables of the motor vehicle including engine and tank-venting apparatus and interrupting the underpressure decay test when the operating variable values show that the measured tank pressure values do not permit a reliable statement as to the operability of the apparatus, the operating variables of the motor vehicle being measurable first during the test method;

determining the apparatus at that time as being nonoperable when the underpressure decay gradient lies above a threshold, otherwise determining the apparatus at that time as being operable; and, opening the shutoff valve and terminating the method.

2. The method of claim 1, wherein the step of checking the operating variables during the underpressure buildup test and for interrupting the test includes the following substeps:

measuring the lean correction of the engine; and, interrupting the test when the lean correction lies above a pregiven threshold.

3. The method of claim 1, wherein the step for testing of operating variables during the underpressure buildup test and for interrupting the test includes the following substeps:

determining the pressure buildup gradient; and, interrupting the test when the underpressure buildup gradient lies above a threshold.

4. Method of claim 1, wherein the step for checking of operating variables during the underpressure buildup test and for interrupting the test includes the following substeps:

measuring a drive signal; and, interrupting the test when the driving speed exceeds a threshold.

5. The method of claim 1, wherein the step for testing of operating variables during the underpressure decay test and for interrupting the test includes the following substeps:

determining changes of the underpressure; and, interrupting the test when the changes lie above a threshold.

6. The method of claim 1, wherein the step for testing of operating variables during the underpressure decay test and for interrupting the test includes the following substeps:

determining changes of the underpressure decay gradient; and, interrupting the test when the gradient increases.

7. The method of claim 1, wherein an overpressure test with the shutoff valve also being closed takes place in a phase having a closed tank-venting valve except for a test phase and only then when, during this test, only an underpressure below a threshold has been determined and the test was performed less than a delay of a pregiven time span, the test described above is carried out.

8. The method of claim 1, wherein an overpressure test with the shutoff valve additionally closed takes place in a phase with closed tank-venting valve after a test phase and only then when, during this test, only an overpressure under a threshold has been determined and when this overpressure test takes place less than a pregiven time span after the test phase, the result of the test described above is fully accepted, otherwise only a result is accepted which shows a large leak.

9. An arrangement for testing the operability of a tank-venting apparatus of a motor vehicle having an internal combustion engine, the tank-venting apparatus including a tank having a tank pressure sensor, an adsorption filter, said absorption filter being connected to the tank via a tank supply line, and a venting line closable by a shutoff valve (AV) and a tank-venting valve (TEV) which is connected to the adsorption filter via a valve line, the arrangement comprising:

a valve control unit for opening and closing the shutoff valve (AV) and the tank-venting valve (TEV);

a sequence control for driving the valve control unit;

an operating-condition determination unit for determining the values of operating variables of the motor vehicle having an engine and a tank-venting apparatus;

an evaluation unit for evaluating the operability of the tank-venting apparatus based on the underpressure building up in the tank after the sequence control has closed the shutoff valve via the valve control unit and has opened the tank-venting valve;

the determination unit is configured as a pressure-gradient test unit and the sequence control and the pressure-gradient test unit are so configured that:

the sequence control checks operating variables of the motor vehicle including engine and tank-venting apparatus, said operating variables being measurable only during the test method, and interrupts the underpressure buildup test when the operating variable values indicate that the measured tank-pressure values permit no reliable statement as to the operability of the apparatus;

the test unit determines the apparatus as being not operable at that time and terminates the method when the underpressure buildup gradient lies below a threshold;

the sequence control closes the tank-venting valve;

the test unit measures the underpressure decaying in the tank and checks operating variables of the motor vehicle including the engine and tank-venting apparatus, the operating variables being measured only during the test method, and the underpressure decay test is interrupted when the operating variable values indicate that the measured tank-pressure values permit no reliable statement as to the operability of the apparatus and when the test unit determines the apparatus as being not operable at that time when the underpressure decay gradient lies above a threshold and otherwise determining the apparatus to be operable at that time; and, the sequence control opens the shutoff valve and terminates the method.

10. The arrangement of claim 9, wherein the operating condition determining unit includes a lambda control unit, an idle signal transducer and a drive signal transducer and the sequence control is so configured that it interrupts the test sequence when, for the underpressure decay test, the lean correction lies above a threshold or no idle is present and the drive signal transducer announces a road speed above a threshold.

11. The arrangement of claim 9, wherein also tests other than the tank-venting diagnosis are interrupted when the measured tank pressure values permit no reliable statement as to the operability of the apparatus.

* * * * *